June 9, 1925.  
W. J. BROOME  
SEAT BED  
Filed Aug. 19, 1922

INVENTOR:  
WILLIAM J. BROOME,  
BY  
Graham + Lewis  
ATTORNEYS.

June 9, 1925.  W. J. BROOME  1,541,105
SEAT BED
Filed Aug. 19, 1922   2 Sheets-Sheet 2
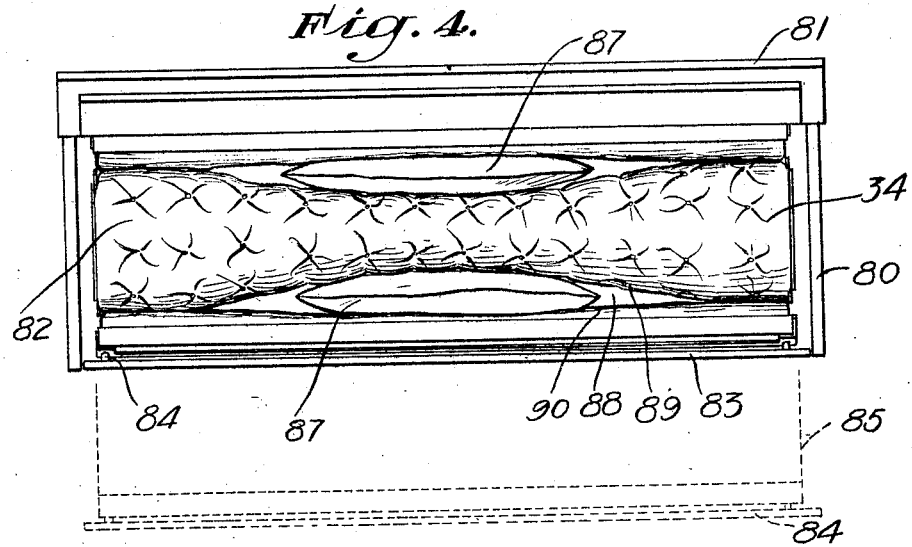
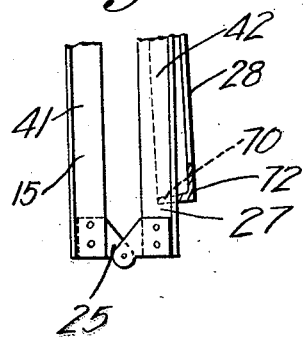
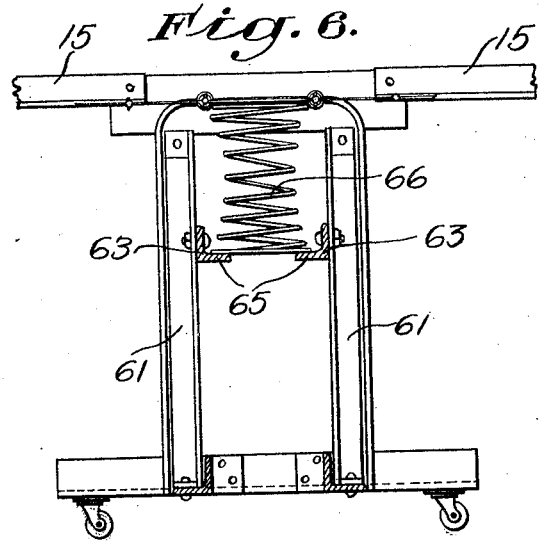
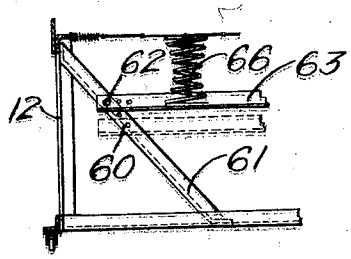
INVENTOR:
WILLIAM J. BROOME,
BY
Graham + Hurrie
ATTORNEYS.

Patented June 9, 1925.

1,541,105

UNITED STATES PATENT OFFICE.

WILLIAM J. BROOME, OF LOS ANGELES, CALIFORNIA.

SEAT BED.

Application filed August 19, 1922. Serial No. 583,005.

*To all whom it may concern:*

Be it known that I, WILLIAM J. BROOME, a citizen of the United States, residing at Los Angeles, in the county of Los Angeles and State of California, have invented a new and useful Seat Bed, of which the following is a specification.

My invention relates to foldable beds and is particularly a bed which may be moved from place to place when in folded condition, and which may be concealed within a window seat or within a recess similar in size and shape to that provided by a window seat.

It is an object of the invention to provide a simple form of structure mounted upon a wheeled carriage and adapted to support a spring fabric, this structure being foldable against the sides of the carriage, thus providing a compact device of no greater height than an ordinary bed and of such width that it may be concealed in a suitable cavity such as the interior of a window seat.

It is a further object of the invention to provide compressible springs for supporting the central portion of the spring fabric and means whereby these springs may be varied in compression so that the supporting force exerted thereby may be adjusted to suit the weight of the sleepers.

It is a further object of the invention to provide a device of this character which may be cheaply constructed yet having great strength and durability.

The especial advantages of my invention and further objects thereof will be made evident hereinafter.

Referring to the drawings which are for illustrative purposes only:

Fig. 4 is a plan view showing a folded bed placed in a window seat.

Fig. 5 is a fragmentary enlarged section showing the manner in which the leg structure fits over the outer spring frames when the leg structures are folded thereagainst.

Fig. 6 is an enlarged fragmentary vertical section taken centrally through the carriage of the bed for the purpose of illustrating the manner in which the central compression springs which I employ are mounted upon adjustably secured longitudinal angles.

Fig. 7 is a fragmentary view taken on a plane represented by the line 7—7 of Fig. 1 illustrating the adjustability in height of the compression spring supporting angles.

Figure 1:
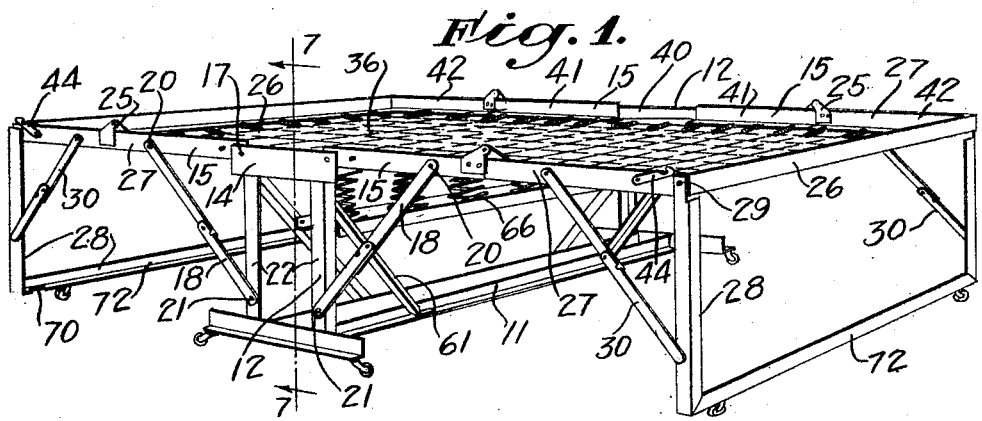
Fig. 1 is a perspective view of a foldable bed, embodying my invention, in extended position.

As shown in the drawing, my invention provides a carriage 11 having an end frame 12 extending upwardly at each end thereof. Each of the frames 12 is provided with a horizontal member 14 to which are attached angle iron links 15. The links 15 are pivoted at 17 to the ends of the members 14 and are supported in outstanding position by collapsible braces 18 which extend from rivets 20 near the outer ends of the links 15 to rivets 21 which connect the lower ends of the braces to the vertical angles 22 of the carriage frames 12.

Hinges 25 are employed for the purpose of attaching the outer spring frames 26 to the ends of each pair of links 15, as shown. At the outer end of the end bars 27 of the frames 26 a leg structure 28 is hinged upon rivets 29. The leg structures 28 are held in vertical position when the bed is extended, by collapsible braces 30. The hinges 25 extend upwardly from the angle members which they connect and provide a point of pivot 32 which is spaced away from the edges of these members so that when the frames 26 are folded back upon the links 15, spaces 33 are left therebetween in which the mattress 34, shown in Fig. 4, is folded. This mattress 34 is supported upon a spring fabric 36 which is stretched across the enclosure provided by the framework made up of the spring frames 26, the links 15, and the members 14.

It will be perceived that the fabric incorporates, with the members to which it is attached, in forming a central section which is that portion of the spring fabric which extends between the members 12; two intermediate portions consisting of pairs of links 15 and that portion of the spring fabric extending therebetween; and two outer sections comprised of the spring frames 26 and the spring fabric supported thereby. Thus the bed structure is divided up into a number of relatively foldable sections which may be termed: the central section 40; the intermediate sections 41; and the outer sections 42. When folding the bed preparatory to its concealment, the mattress is left upon the spring fabric and is folded therewith as the different sections are folded.

Figure 2:
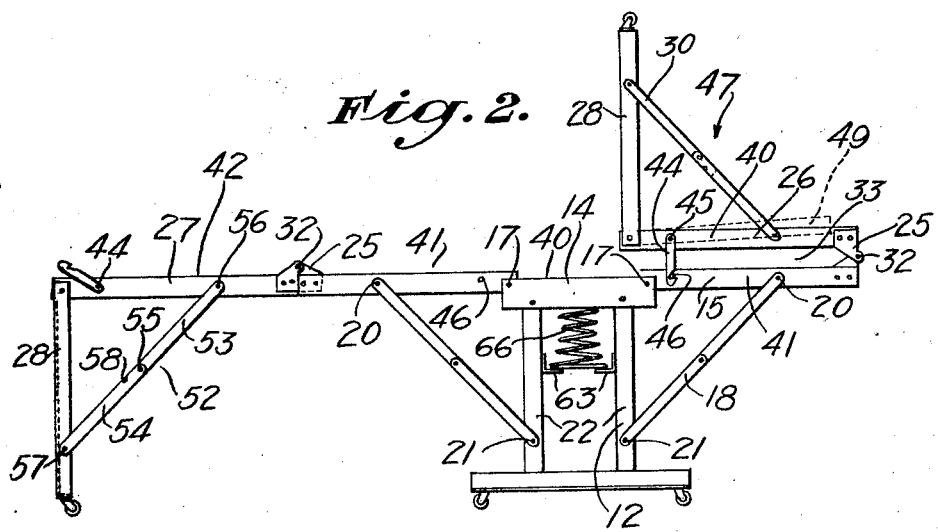
Fig. 2 is a side elevation of the bed shown in Fig. 1 illustrating the first step in the procedure of folding the bed.

For the purpose of clearly illustrating the details of the bed structure itself, the mattress has been omitted from all views except Fig. 4. As shown in Fig. 2, the first step in folding this bed consists of swinging the outer sections 42 upwardly around the hinges 25 so that they are thereupon thrown back over the intermediate sections 41. Latch bars 44 pivoted at 45 upon the end angles 27 of the outer section 42 engage pins 46 upon the links 15 when the outer sections are folded back over the intermediate sections so that these sections are held together, in the position shown at 47 in Fig. 2, until the latches 44 are released. After the folding of the outer sections back upon the intermediate sections, the collapsible braces 30 may be collapsed, allowing the leg structure 28 to be folded down against the outer sections as indicated at 49.

Figure 3:
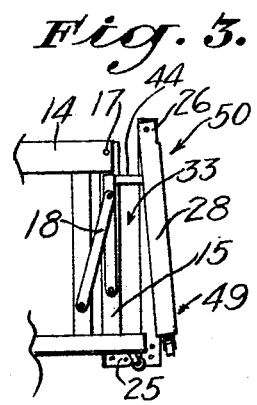
Fig. 3 is a fragmentary view illustrating the next step.

The final step in folding the bed consists in collapsing the braces 18 and allowing the intermediate sections, with the outer sections folded thereagainst, to be dropped into the position shown at 50 in Fig. 3, against the side of the carriage 11. The braces 18 and 30 are of simple construction as designated at 52 in Fig. 2, and consists of links 53 and 54 which are pivoted together at 55, the outer ends of these links being pivoted to the bed structure at 56 and 57. The members 53 and 54 can only be folded upwardly upon the pivot 55 owing to the presence of an overlapping projection 58 which is formed upon the member 53 which engages the edge of the member 54, when these members are in extended position, as shown.

Evenly spaced holes 60 are punched in the diagonal angle braces 61 which support the end frames 12 of the carriage as shown in Fig. 7; and by means of bolts 62 which pass through the holes 60, longitudinal angles 63 are secured underneath the central section 40 of the spring fabric. The horizontal legs 65 of the angles 63 are directed inwardly as shown in Fig. 6, and compression springs 66 are mounted thereupon, the upper ends of these springs resting against the underside of the spring fabric. By raising or lowering the angle 63, which is accomplished by employing different sets of holes 60, the compression created in the springs 66 may be varied to give a desired deflection under a designated loading.

As shown at 70 in Fig. 1 and Fig. 5, notches are cut in the longitudinal angle members 72 of each leg structure 28. The notches 70 are placed near each end of the section 72 so that the end angles 27 of the outer spring frame 26 will be received therein, thus allowing leg structures 28 to fit down more closely against the outer section when the structure is folded, this being shown particularly in the enlarged fragmentary view of Fig. 5.

In Fig. 4 of the drawing I show a window seat 80 provided with a cover 81, shown in raised position, which may be employed for the purpose of concealing a folded bed 82. The front 83 of such a seat 80 must necessarily be removable so that the bed 82 may be moved outwardly through the front thereof as indicated by the dotted lines 85. In Fig. 4 I show a manner in which the front 83 may be attached to the forward leg structure 28 of the bed at 84, thus making the removal of the front 83 from the seat coincident with the removal of the bed therefrom. After the bed is folded the pillows 87 which are used therewith may be tucked down into the pockets 88 formed between the downwardly extending portion 89 of the mattress and the upwardly extending ends 90 thereof. This may be conveniently accomplished owing to the fact that when the bed structure is folded, the tension is removed from the spring fabric and it may be deflected to accommodate the pillows, as shown in Fig. 4.

My invention provides a rigid bed structure which may be folded, as hereinbefore made evident, so that it may be placed in an out of the way place or concealed in such a seat structure as described. The provision of the compression springs 66 for the purpose of supporting the central portion of the fabric adds considerably to the sleeping qualities of the bed as it prevents the central depression of the spring fabric.

I claim as my invention:

1. In a folding bed, the combination of: a carriage providing a central spring section; an intermediate spring section pivoted upon each side of said central spring section, said intermediate sections being foldable against the sides of said carriage; an outer spring section pivoted to each of said intermediate spring sections at the outer extremity thereof, said outer spring sections being adapted to be folded in against said intermediate spring sections; means for supporting said intermediate sections in laterally extended position; and means secured to said outer sections for supporting the outer extremities of said outer sections.

2. In a folding bed, the combination of: a carriage providing a central spring section; an intermediate spring section pivoted upon each side of said central spring section, said intermediate sections being foldable against the sides of said carriage; an outer spring section pivoted to each of said intermediate spring sections at the outer extremity thereof, said outer spring sections being adapted to be folded in against said intermediate spring sections; collapsible braces for supporting said intermediate sections in laterally extended position; and foldable legs for supporting the outer extremities of said outer sections.

3. In a folding bed, the combination of: a carriage providing a central spring section; an intermediate spring section pivoted upon each side of said central spring section, said intermediate sections being foldable against the sides of said carriage; vertically disposed compression springs for supporting said central spring section; means adjustably mounted by said carriage, for supporting said compression springs, said means being adjustable in height so as to vary the compression of said springs; and an outer spring section pivoted to each of said intermediate spring sections at the outer extremity thereof, said outer spring sections being adapted to be folded in against said intermediate spring sections.

4. In a folding bed, the combination of: a carriage providing a central spring section; an intermediate spring section pivoted upon each side of said central spring section, said intermediate sections being foldable against the sides of said carriage; vertically disposed compression springs for supporting said central spring section; means adjustably mounted by said carriage, for supporting said compression springs, said means being adjustable in height so as to vary the compression of said springs; an outer spring section pivoted to each of said intermediate spring sections at the outer extremity thereof, said outer spring sections being adapted to be folded in against said intermediate spring sections; and foldable means for supporting said intermediate and outer sections in extended position.

5. In a folding bed, the combination of: a carriage providing a central spring section; an intermediate spring section pivoted upon each side of said central spring section, said intermediate sections being foldable against the sides of said carriage; vertically disposed compression springs for supporting said central spring section; means adjustably mounted by said carriage, for supporting said compression springs, said means being adjustable in height so as to vary the compression of said springs; an outer spring section pivoted to each of said intermediate spring sections at the outer extremity thereof, said outer spring sections being adapted to be folded in against said intermediate spring sections; collapsible braces for supporting said intermediate sections in laterally extended position; and foldable legs for supporting the outer extremities of said outer sections.

6. In a folding bed of the class described, the combination of: a carriage having an upstanding frame at each end thereof surmounted by a horizontal bar; an intermediate link so pivoted at each end of each of said horizontal bars as to be foldable down against said frames; and an outer spring frame pivoted to the outer ends of each pair of links, said spring frames being foldable in against said links; a spring fabric extended across the enclosure formed by said bars, said links, and said spring frames; collapsible braces for supporting said links in extended posititon; and a foldable leg structure attached to the outer extremity of each spring frame.

7. In a folding bed of the class described, the combination of: a carriage having an upstanding frame at each end thereof surmounted by a horizontal bar; an intermediate link so pivoted at each end of each of said horizontal bars as to be foldable down against said frames; an outer spring frame pivoted to the outer ends of each pair of links, said spring frames being foldable in against said links; a spring fabric extended across the enclosure formed by said bars, said links, and said spring frames; collapsible braces for supporting said links in extended position; a foldable leg structure attached to the outer extremity of each spring frame; vertically disposed compression springs supporting said spring fabric on a line extending between said bars; and longitudinally extending members for supporting said compression springs, said members being adjustably supported by said carriage structure so that the height thereof may be adjusted to vary the compression created in said vertical springs.

In testimony whereof, I have hereunto set my hand at Los Angeles, California, this 12th day of August, 1922.

WILLIAM J. BROOME.